Oct. 26, 1971  A. EDELSTEIN  3,615,068

PRECISION ROTARY TABLE

Filed July 14, 1969  2 Sheets-Sheet 1

INVENTOR
ARTHUR EDELSTEIN
BY James and Franklin
ATTORNEY

Oct. 26, 1971  A. EDELSTEIN  3,615,068

PRECISION ROTARY TABLE

Filed July 14, 1969  2 Sheets-Sheet 2

INVENTOR
ARTHUR EDELSTEIN

BY James and Franklin
ATTORNEY 3,615,068
PRECISION ROTARY TABLE
Arthur Edelstein, Jamaica, N.Y., assignor to Ardel
   Instrument Co., Inc., Jamaica, N.Y.
Filed July 14, 1969, Ser. No. 841,417
Int. Cl. A47b 95/00, 91/00
U.S. Cl. 248—349                                    17 Claims

ABSTRACT OF THE DISCLOSURE

A precision rotary table for use in electro-optical research includes a stationary base member and a movable support part operatively connected to the base member and rotatable relative thereto. Precise positioning of the movable part in response to actuation of a manually operated means is effected by employing gearing mechanism in which the various rotating parts are continuously subjected to a constant force in a direction such that the meshing gears are placed in back-lash-free engagement with each other. An attachment device may be rotatably connected to the movable part, that device including mechanism which permits quick movement of the attachment device between two preselected positions.

---

This invention relates to rotary positioning devices, and specifically to a precision rotary table.

A wide variety of rotary tables are currently used for research purposes. These tables are employed to rotate prisms, crystals, polarizers and the like to desired rotative positions. It is imperative in most applications that such positioning be carried out with great precision. Furthermore, it is extremely important that the rotary table be capable of repeatedly positioning the device with the same precision. Unfortunately, manufacturing tolerances which occur in the normal manufacture of the several movable parts in a rotary table render it virtually impossible to achieve a positioning accuracy of better than a certain lower limit. Thus, far, increased accuracy in rotary tables of this type have been attempted by careful manufacture of the various parts, but even parts made by special techniques still include variations in dimensions which adversely affect the preciseness with which the device can be operated.

The subject invention provides a solution to the aforementioned difficulties by the inclusion of a means so positioned and structured that the various rotating parts in a rotary table are held under constant pressure in close contact with each other. In this manner, lost motion between the rotating parts is prevented and the accuracy of the rotary table is greatly increased.

Broadly, the rotary table of the invention comprises a stationary base member, a ring-like support part operatively connected to the base member and rotatable relative thereto, first means operatively connected to the support part for rotating the part, and means effective to continuously force the first means into a tight engagement with the support part during the operation of the device so that lost motion between these rotating members is prevented.

In one embodiment of the invention, the first means includes a pinion which is mounted on a shaft carried in bearings. The pinion meshes with a gear which is integrally secured to the support part and drives the part through the gear engagement. In the preferred embodiment a driving means for rotating the first means is included and comprises a worm affixed to a second shaft and a worm wheel secured to the pinion shaft in a position to mesh with the worm. A manually rotatable means such as a knurled knob is secured at one end of the second shaft so that motion of the rotating components may be manually effected.

In order to provide a tight engagement between the several mating gears so that backlash is substantially eliminated a resilient member is positioned in the system and is effective to essentially reduce the distances between mating gear centers. The member is preferably wedged between the bearing on the pinion shaft and the wall of the base member. In this position, the resilient member places the pinion shaft under a pressure which causes the pinion to maintain contact with the gear on the support part. This radial pressure also has a force component which continuously urges the worm wheel into a similarly tight engagement with the worm on the second shaft. Thus, the resilient member forces both of these rotating parts against their respective mating rotating parts, and lost motion between all of these parts is effectively avoided.

If properly located, the resilient member may provide still another force component along the axis of the pinion shaft. In the preferred embodiment this is accomplished by wedging the resilient member between a shoulder on the bearing and a flange on the base member, both the shoulder and flange being extended substantially laterally relative to the axis of the shaft and being spaced from one another substantially axially of the shaft. With this construction, the worm wheel and the pinion are axially positioned relative to their respective mating gears due to the resilient member being compressed axially in the space. In order to ensure the permanency of the gear location during the operation of the rotary table, the lower portion of the pinion shaft engages a non-resilient device such as a washer or the like, which rests on the base member. Still another resilient member may be placed below the lower bearing in order to provide a further radial force to the shaft so that additional radial pressure on the pinion and worm wheel may be provided.

Because a high degree of accuracy is desired, the manually rotatable means in the preferred embodiment is turned only one revolution for every arc degree traversed by the circular part. With this arrangement, the position of the circular part may be monitored at intervals of one arc minute. However, it will be appreciated that with such a fine accuracy the manually operated means must be rotated many times for the circular part to traverse any considerable distance. Thus, if it is desired to rotate the table 90°, 90 turns will be required. Many times during the use of a rotary table such as in polarizer experiments, a particular angle must be repeatedly traversed. A rotary attachment device is therefore provided to enable the operator of the rotary table to repeatedly traverse a large distance in a short period of time. The attachment device is preferably mounted on the previously described rotatable part. It includes a lower element which is secured to the rotatable part and an upper element rotatably mounted on the lower element. The upper element functions as a rotary table itself once the attachment device is mounted in position, that is, it carries an optical device to a position along the arc of the circle over which the upper element is moved. Positive stops may be provided on the stationary base member and on the lower element of the attachment device between which the upper element of the attachment device is freely movable, thus providing for rapid but accurate positioning of that upper element in either of two predetermined positions. The rotative spacing between those positions can be accurately adjusted and varied by rotating the rotatable part of the device proper, which carries the lower element of the attachment device.

To the accomplishment of the above, and to such other objects as may hereinafter appear, the present invention relates to the construction of a rotary table device as defined in the appended claims, and as described in this specification, taken together with the accompanying drawings, in which:

Figure 1:
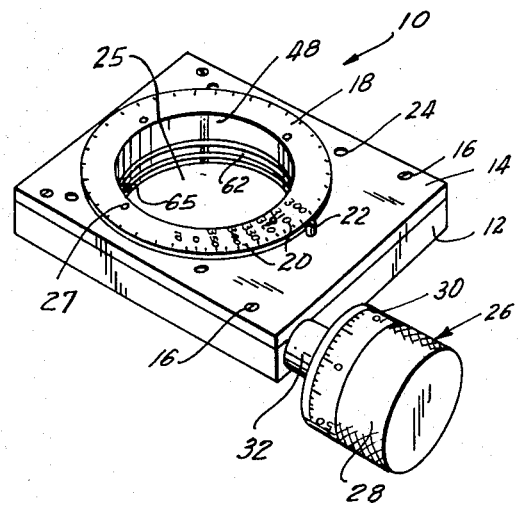
FIG. 1 is a perspective view of a rotary table device typical of the invention.

Referring to FIG. 1, a rotary table is designated generally by the numeral or frame 10. The table 10 includes a base member 12 and a cover 14 secured to the base member by means of bolts 16. A ring-like support part 18 (on which the optical device or the like is adapted to be mounted) is rotatably positioned in one area of the cover 14, and includes a series of markings 20 which indicate in degrees the circumferential position of the support part 18. For this purpose an index pin 22 is mounted in the cover 14 and positioned adjacent the markings 20 on the part 18. The cover 14 is also provided with a plurality of holes 24, continuing into base member 12, which may be used for mounting the table to a support. Holes 27 in the part 18 may be used for mounting other devices to hold prisms, crystals and other optical components. A large opening 25 is also provided in the central portion of part 18 so that the optical component may be rotated on its axis, that is, so that light may enter from below the optical component. A manually rotatable member generally designated 26 includes a knurled knob section 28 and a section 30 which is provided with a plurality of index marks. The section 30 is positioned adjacent a bushing 32 fixed in base member 12 which is also provided with index marks. As illustrated more clearly in FIG. 2, the member 26 is spaced from the bushing 32 as shown at 34 and is rotatable relative thereto. In the actual operation of the device, the part 18 is driven in rotation by the rotation of the member 26. An indication of the specific amount of movement is obtained by reading the position of part 18 at the markings 20 and the position of the markings on section 30, the latter constituting a vernier or fine indication and the former constituting a coarse indication.

Figure 2:
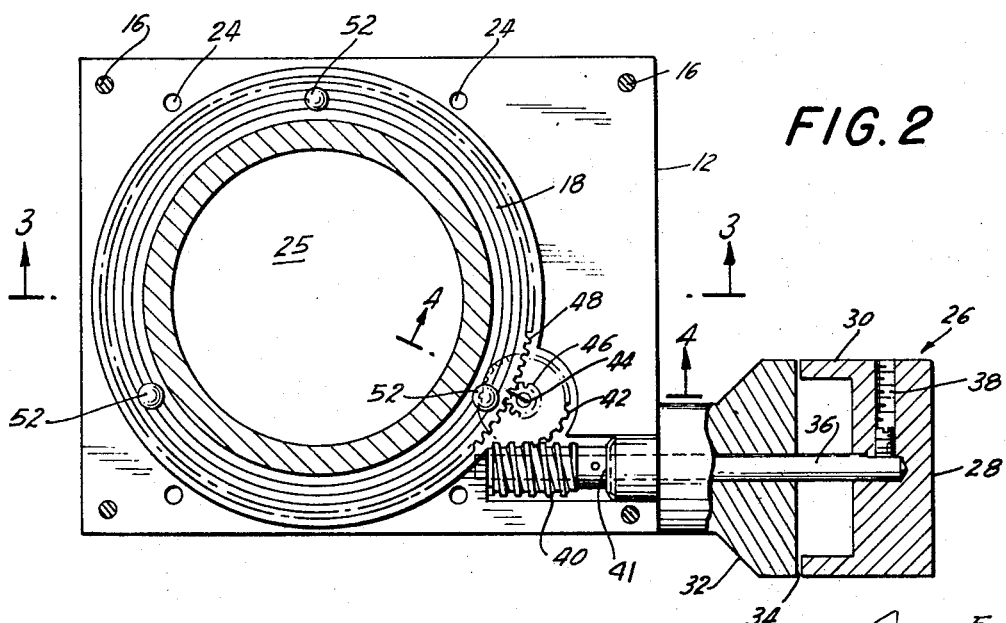
FIG. 2 is a plan view partially in section taken on line 2—2 of FIG. 3.

The coupling mechanism between the manually rotatable member 26 and the part 18 is more clearly illustrated in FIG. 2. As there shown, the member 26 is tightly connected to a shaft 36 by means of a screw 38. The connection between member 26 and the shaft 36 is a rigid one since it is highly desirable that there be no motion between these parts when the member 26 is rotated. Worm 40 is pinned to shaft 36, and is constrained axially of the shaft 36 by spring washer 41. Worm 40 in turn meshes with worm wheel 42. The worm wheel 42 is mounted on a shaft 44 (see FIG. 4). The pinion gear 46 is also securely mounted on shaft 44 directly above the worm wheel 42. The ring-like part 18 is integrally formed with a gear 48, which meshes with and is driven by the pinion 46.

Figure 3:
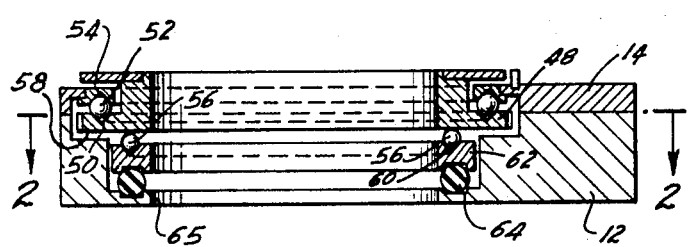
FIG. 3 is a transverse section taken on line 3—3 of FIG. 2.

The mechanism effective to rotatably mount ring-like part 18 on a base member 12 is clearly illustrated in FIG. 3 The gear 48 is provided with a ground race 50 in the form of a V in which three balls 52 are positioned at 120° intervals as shown in FIG. 2. A matching V race 54 is placed in the cover 14 where the latter overlies the ground race 50. The balls 52 are maintained in their relative positions by a conventional ball retainer (not shown) and ride in the V grooves 50 and 54. A second group of balls 56 is similarly maintained at 120° intervals by a conventional retainer (not shown) and provides a partial support for the lower surface 58 of gear 48. The balls 56 are supported in a race 60 which is also in the form of a V. The race 60 is formed in a supporting member 62 which itself is supported on the resilient member 64. The member 64 which may take the form of an O ring, belville washer, or other resilient member, provides pressure effective to place the balls 52 and 56 under compression against the various V surfaces. The resilient member 64 is seated on the flanged portion 65 of base member 12.

Figure 4:
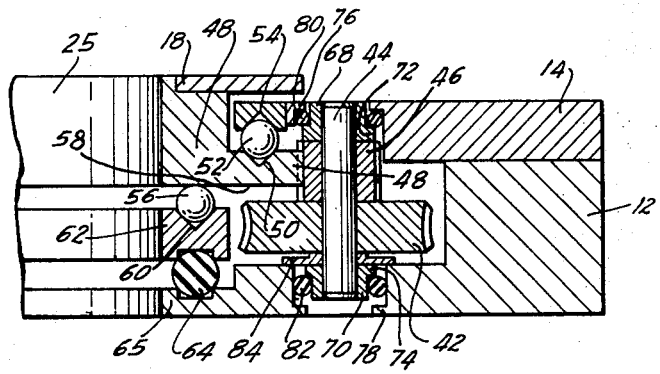
FIG. 4 is a fragmentary section taken along stepped line 4—4 of FIG. 2.

The shaft 44 which carries the pinion 46 and the worm wheel 42 is best shown in FIG. 4. As there illustrated, the shaft 44 is mounted within the bearings 68 and 70 which are provided with shoulders 72 and 74 respectively. The cover 14 is provided with a flanged section 76, while the base member 12 is provided with a similar flanged section 78. The shoulders 72 and 74 and the flanged sections 76 and 78 respectively oppose one another. Shoulder 72 and flanged section 76 are positioned to provide a seat for resilient member 80 which may be an O ring. Resilient member 82 is positioned between bearing 70 and the wall of the base member 12. O-ring 80 is compressed both axially and radially when seated between bearing 68 and section 76, while O-ring 82 may be compressed radially but not axially between bearing 70 and the wall of base member 12.

The wedged resilient members 80 and 82 provide several forces on the pinion shaft 44. Since both members 80 and 82 are radially compressed they urge the pinion 46 into a tight engagement with the gear 48 and simultaneously cause the worm wheel 42 to be tightly meshed with the worm 40. In addition, because member 80 is axially compressed both the pinion 46 and the worm wheel 42 are forced downwardly toward the lower bearing 70. A washer 84 is positioned at the lower end of the shaft 44 and rests against the base member 12. The washer forms a non-flexible support which resists the axial force of member 80. Thus, the shaft 44 obtains a permanent axial position with and thereby locks the vertical position of pinion 46 and worm wheel 42. The lower bearing 70 "floats" beneath the washer 84 and therefore provides no axial pressure on the shaft 44. With this construction, backlash between rotating gears is substantially reduced and the rotation of the manually operated member 26 is accurately transmitted to the circular part 18.

Figure 5:
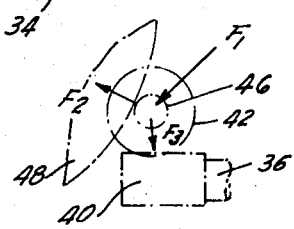
FIG. 5 is a schematic illustration of a force and the several components thereof which is exerted during the operation of the device in FIG. 1.

FIG. 5 schematically illustrates the radial force $F_1$ provided by the resilient members 80 and 82 on the pinion shaft 44. The overall force is shown to be generally in the direction $F_1$ but may be broken into components $F_2$ and $F_3$. It is noted that the component $F_2$ is in a direction to cause the pinion 46 to tightly engage the gear 48 on the ring-like part 18. Similarly the force $F_3$ is in a direction to cause the worm wheel 42 to tightly engage the worm 40.

In the preferred embodiment of the invention, the members 80 and 82 are O rings composed of a resilient material such as rubber or the like. The O rings are provided with a thickness which requires that they be forced into place around the bearings 68 and 70 so that the bearings, and thus the shaft 44, are placed under compression. Careful machining of the several parts to provide a very tight seating area for the O-ring will ensure that the proper force is imparted to the several rotating parts. It has been determined that the distance between the centers of worm wheel gear 42 and pinion gear 46 on the one hand and the centers of worm gear 40 and gear 48 on the other hand is approximately .005 to .010 inch below normal when the construction of the type illustrated in FIG. 4 is employed. As a result, virtually no lost motion is experienced when the parts rotate and accuries in the order of six arc seconds may be obtained when traversing short distances.

It has been determined that a preferred gear reduction ratio between the part 18 and the manually rotatable member is in the order of 360:1. In one embodiment, the gear ratio between gear 48 and the pinion 46 may be 12:1, while the ratio between the worm wheel 42 and the worm 40 is approximately 30:1. With this high ratio, one turn of the member 26 will move the circular part 18 only one arc degree. The index marks on the section 30 of the member 26 can therefore be graduated to increments of as low as one arc minute, which is lower than most precise devices currently in use.

Figure 6:
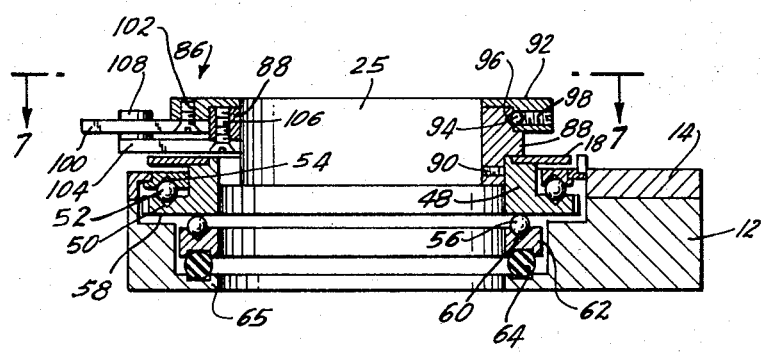
FIG. 6 is a similar sectional view to that shown in FIG. 3 with the addition of a rotary attachment device.
Figures 7, 8:
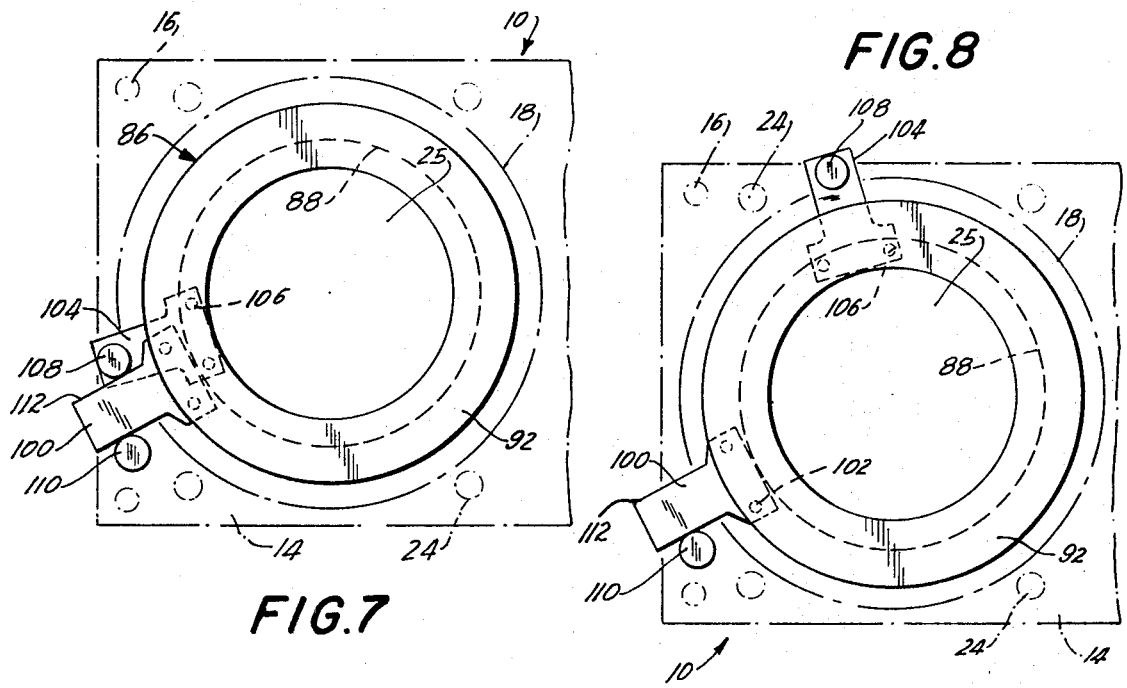
FIG. 7 is a partial plan view of the attachment device illustrated in FIG. 6.
FIG. 8 is a similar plan view of that of FIG. 7, illustrating a second position of the several components on the attachment device.

FIGS. 6 through 8 illustrate a rotary attachment device 86 which may be mounted on the rotary table device 10 shown in FIG. 1. Referring to FIG. 6, it will be seen that the attachment device is generally designated by the numeral 86 and comprises a lower part 88 which is secured to the inside surface of the gear 48 by means of a set screw 90. An upper part 92 is operatively connected to lower part 88, and is rotatable relative thereto. In order to effect the rotation a plurality of bearing balls 94 are interposed between the parts 88 and 92, the balls sliding in the V groove 96 in part 88 and are secured in position by set screws 98 in part 92. A projecting tab 100 is secured to the upper rotary part 92 by screw 102. A similar projecting tab 104 is secured to the stationary part 88 by means of screw 106. This tab 104 is provided with an extending button 108 which projects upwardly a distance such that it extends into the path of movement of projecting tab 100.

FIGS. 7 and 8 illustrate by means of plan views the relative positions of the several tabs 100 and 104 during the operation of the device. As shown in FIG. 7 a stop member 110 is pressed into the cover 14 on the rotary device 10 and extends upwardly therefrom. The tab 100 is initially positioned in contact with stop member 110 and the tab 104 is positioned initially such that the extended button 108 engages the edge 112 of the tab 100. This alignment of members represents the starting position for the device. Since tab 104 is fastened to the stationary part 88, and the stationary part 88 is fastened to the gear 48 on the rotary device 10, the manually operated member 26 controls the position of the stationary part 88. Therefore, when the member 26 is rotated part 88 is carried with part 18 to a desired position. The tab 104 is carried with part 88 while the part 92 and its tab 100 are also rotated to the new position. The new position is illustrated in FIG. 8, and by way of example represents a 90° movement of the parts 18 and 88. This position is marked by the extended button 108. As noted, the tab 100 and the upper part 92, to which it is affixed, are rotatable relative to the lower part 88 and the tab 104 which is connected to it, and are shown after rotation back to stop 110. Thus, if the optical device which is to be positioned is joined to the attachment device 86 after the desired position represented by the position of button 108 is achieved, then the optical device can be accurately and quickly rotated 90° by rotating tab 100 and part 92 between the button 108 and stop member 110, those elements representing two accurately positioned stops between which an optical device may be quickly and repeatedly maneuvered with no sacrifice in accuracy.

From the foregoing it will be appreciated that a rotary device of the invention is capable of precise positioning of an optical device or the like about an arc of 360°. The prevention of lost motion between rotary parts enables the rotation to be effected with an accuracy heretofore not readily achieved. In addition, an attachment device enables any position to be accurately repeated without the necessity of tedious manipulation of the various parts.

I claim:
1. A rotary device effective for precisely locating a rotative position comprising a frame, a support part operatively connected to said frame and rotatable relative thereto, first means operatively connected to said support part and said frame for rotating said part, said first means comprising at least two rotatable means operatively connected in driving relationship, and forcing means effective to apply a pressure on at least one of said rotatable means in a direction perpendicular to its axis of rotation to forcefully maintain driving engagement between said rotatable means during the operation of said rotary device, such that there is substantially no lost motion between said rotatable means during the operation of said rotary device even after considerable wear of the meshing gear surfaces.

2. The device of claim 1, in which said rotatable means comprises first and second gearing means operatively connected to said support part and said frame respectively, said forcing means being effective to positively maintain said first and second gearing means forcefully meshed in operative driving engagement.

3. The device of claim 2, wherein said first gearing means is fast on said support part and said second gearing means is fast on a shaft, means rotatably mounting said shaft on said frame, said forcing means comprising means disposed between said shaft and said frame and effective to apply a positive radial pressure on said rotatable mounting means in a direction to forcefully mesh said second gearing means with said first gearing means.

4. The device of claim 3, wherein said forcing means comprises a resilient member disposed between said shaft and said frame, said shaft compressing said resilient member against said frame when said first and second gearing means are meshingly engaged thereby to forcefully maintain such meshing engagement even after considerable wear of the meshing gear surfaces.

5. In the device of claim 3, driving means for rotating said second gearing means, said driving means comprising third and fourth gearing means operatively meshed together, said third gearing means being fast to said shaft and said fourth gearing means being operatively drivingly connected to a manually rotatable member, whereupon when said manually rotatable member is rotated the rotative motion thereof is transmitted to said support part to rotate the same, said forcing means being effective to simultaneously apply a pressure to said first and third gearing means in a direction to forcefully maintain them in operative meshing engagement with said second and fourth gearing means, respectively, during the operation of said rotary device, whereby lost motion between said first and second gears is substantially prevented.

6. The device of claim 4, in which said means effective to rotatably mount said shaft on said frame comprise a bearing means, and in which said resilient forcing means is compressed between said bearing means and said frame when said first and second gearing means are meshingly engaged, thereby to provide a radial force on said shaft in a direction to force said second gearing means towards said first gearing means.

7. The device of claim 6, in which said bearing means is provided with a shoulder area and said base member is provided with a flanged section spaced from and at least partially opposing said shoulder area, said shoulder area and said flanged section being extended substantially laterally relative to the axis of said shaft and being spaced from one another substantially axially of said shaft, said resilient member being compressed in said axial space between said shoulder area and said flanged section, whereby an axial force is imparted to said shaft to axially position said second gearing means on said shaft.

8. In the device of claim 7, a non-resilient member engaging said shaft and effective to limit movement of said shaft in the direction of said axial force, thereby to axially fix the position of said second gearing means.

9. In the device of claim 6, a second bearing means mounted on said shaft and a second resilient member radially compressed between said second bearing means and said frame when said first and second gearing means are meshingly engaged, thereby to provide an additional radial force on said shaft to force said second gearing means towards said first gearing means.

10. The device of claim 5, in which said means effective to rotatably mount said shaft on said frame comprises a bearing means, and in which said resilient forcing means is compressed between said bearing means and said frame when said first and second gearing means are meshingly engaged, thereby to provide a radial force on said shaft in a direction to force said second gearing means towards said first gearing means.

11. In combination with the device of claim 1, a rotary attachment means comprising a lower part secured to said support part, an upper part operatively connected to said lower part and rotatable relative thereto, and a tab extending outwardly from said upper part on said attachment device, said tab on said upper part being movable to a specific position by the movement of said upper part relative to said lower part, and a stop element carried by said lower part toward which said upper part tab is movable and with which said upper part tab is engageable.

12. In the device of claim 11, a stop member carried by said base member comprising a projection extending upwardly from said base member with which said upper part tab is engageable, and in which said stop member carried by said lower part comprises a projection extending upwardly from a tab extending laterally out from said lower part.

13. The device of claim 10, in which said bearing means is provided with a shoulder area and said base member is provided with a flanged section spaced from and at least partially opposing said shoulder area, said shoulder area and said flanged section being extended substantially laterally relative to the axis of said shaft and being spaced from one another substantially axially of said shaft, said resilient member being compressed in said axial space between said shoulder area and said flanged section, whereby an axial force is imparted to said shaft to axially position said second gearing means on said shaft.

14. In the device of claim 13, a non-resilient member engaging said shaft and effective to limit movement of said shaft in the direction of said axial force, thereby to axially fix the position of said second gearing means.

15. The device of claim 6, wherein said resilient member is an O-ring surrounding said bearing means and seated in said frame in a position displaced radially inwardly toward said first gearing means, whereby when said shaft is seated in said bearing means the engagement of said first and second gearing means moves said shaft radially outwardly within said O-ring to a position offset from the relaxed central axis of said O-ring, thereby compressing that portion of said O-ring remote from said first gearing means against said frame to maintain tight meshing engagement between said first and second gearing means.

16. The device of claim 10, wherein said resilient member is an O-ring surrounding said bearing means and seated in said frame in a position displaced radially inwardly toward said first gearing means, whereby when said shaft is seated in said bearing means the engagement of said first and second gearing means moves said shaft radially outwardly within said O-ring to a position offset from the relaxed central axis of said O-ring, thereby compressing that portion of said O-ring remote from said first gearing means against said frame to maintain tight meshing engagement between said first and second gearing means.

17. In a gear train for a precision rotary device having a frame, a member rotatably mounted in said frame, and an adjusting means for adjusting the rotary position of said rotatable member on said frame, a first gearing means in operative driving relationship to said rotatable member, a shaft rotatably mounted in said frame in operative driving relationship to said adjusting means, a second gearing means mounted fast on said shaft, a resilient bearing member disposed between said shaft and said frame, said resilient member being compressed against said frame as a result of the operative meshing engagement of said first and second gearing means, thereby forcefully to maintain said operative meshing engagement even after considerable wear of the meshing gear surfaces.

References Cited
UNITED STATES PATENTS

| | | | |
|---|---|---|---|
| 1,143,279 | 6/1915 | Johnson | 108—104 X |
| 1,259,126 | 3/1918 | Parkes | 248—186 |

CHANCELLOR E. HARRIS, Primary Examiner

U.S. Cl. X.R.

108—104